United States Patent
Nishida et al.

(10) Patent No.: US 12,073,607 B2
(45) Date of Patent: Aug. 27, 2024

(54) RECOGNITION MODEL DISTRIBUTION SYSTEM AND UPDATING METHOD OF RECOGNITION MODEL

(71) Applicant: Hitachi, Ltd., Tokyo (JP)

(72) Inventors: Takehisa Nishida, Tokyo (JP); Mariko Okude, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 17/638,571

(22) PCT Filed: Feb. 12, 2020

(86) PCT No.: PCT/JP2020/005253
§ 371 (c)(1),
(2) Date: Feb. 25, 2022

(87) PCT Pub. No.: WO2021/049062
PCT Pub. Date: Mar. 18, 2021

(65) Prior Publication Data
US 2022/0406041 A1    Dec. 22, 2022

(30) Foreign Application Priority Data
Sep. 10, 2019 (JP) ................. 2019-164248

(51) Int. Cl.
*G06V 10/774* (2022.01)
*G06V 10/776* (2022.01)
(Continued)

(52) U.S. Cl.
CPC ........ *G06V 10/776* (2022.01); *G06V 10/7747* (2022.01); *G06V 20/58* (2022.01); *G06V 20/64* (2022.01)

(58) Field of Classification Search
CPC ............ G06V 10/776; G06V 10/7747; G06V 10/774; G06V 10/87; G06V 20/58; G06V 20/64; G06T 7/00; G08G 1/16
See application file for complete search history.

(56) References Cited

U.S. PATENT DOCUMENTS

2017/0243083 A1   8/2017  Wang et al.
2018/0308281 A1  10/2018  Okoyama
(Continued)

FOREIGN PATENT DOCUMENTS

| CN | 110472496 A | * | 11/2019 | ......... G06K 9/00718 |
| JP | 2017-151973 A | | 8/2017 | |

(Continued)

OTHER PUBLICATIONS

International Search Report with English translation and Written Opinion issued in corresponding application No. PCT/JP2020/005253 dated May 12, 2020.

*Primary Examiner* — Carol Wang
(74) *Attorney, Agent, or Firm* — Foley & Lardner LLP

(57) ABSTRACT

The purpose of the present invention is to provide a technology for updating a recognition model so that even if there were errors in recognition of an unknown scene or the like, the scene can be recognized quickly. The present invention is provided with a data analysis unit 11 that, on the basis of data from an outside recognition unit 32 provided to a vehicle, acquires from among previously stored recognition models a model approximate to a recognition model recognized by the outside recognition unit 32, and that reproduces the acquired model in the form of computer graphics images. The data analysis unit 11 is provided with: a difference extraction unit 114 that compares the reproduced computer graphics images and data from the outside recognition unit 32 and extracts a difference therebetween; an object recognition unit 116 that recognizes an object relating to the
(Continued)

difference extracted by the difference extraction unit 114; and a scene reconfiguration unit 117 that creates computer graphics images having the object recognized by the recognition unit 116 reflected therein.

9 Claims, 7 Drawing Sheets

(51) Int. Cl.
*G06V 20/58* (2022.01)
*G06V 20/64* (2022.01)

(56) References Cited

U.S. PATENT DOCUMENTS

2019/0220029 A1    7/2019  Fukuhara et al.
2020/0074266 A1*  3/2020  Peake ..................... G06T 7/246

FOREIGN PATENT DOCUMENTS

| WO | WO-2016130719 A2 * | 8/2016 | ............ B60W 30/10 |
| WO | WO-2016/157277 A1 | 10/2016 | |
| WO | WO-2017/171005 A1 | 10/2017 | |
| WO | WO-2018/066351 A1 | 4/2018 | |

\* cited by examiner

RECOGNITION MODEL DISTRIBUTION SYSTEM AND UPDATING METHOD OF RECOGNITION MODEL

TECHNICAL FIELD

The present invention relates to a recognition model distribution system and an updating method of a recognition model.

BACKGROUND ART

Currently, technology development has been progressed to realize automatic driving of automobiles. A vehicle is equipped with a camera to detect other vehicles, pedestrians, and objects such as traffic lights.

In the image recognition technology for images of in-vehicle cameras provided in vehicles, the machine learning technology such as deep learning is applied in some cases. When applying the machine learning technology, a sample of actual road driving is necessary, but it has been difficult to extract a sample necessary for learning including, for example, harsh weather conditions such as raining, backlight, and fog.

For this problem, there is a technique described in, for example, Patent Literature 1. Patent Literature 1 discloses: generating an image for simulation in which a region (a landscape based on a latitude, a longitude, a direction, and a field of view on a map) specified by position information is reproduced by computer graphics; recognizing and detecting a specific object from the generated image for simulation by using a recognition function module 204a that is a test target or a machine learning target; and improving learning efficiency in such a manner that a learning unit 204b inputs a video photographed by a camera device or a virtual CG image to the recognition function module 204a to extract feature points of images that are actually difficult to photograph and are difficult to reproduce, thereby diversifying extraction patterns.

CITATION LIST

Patent Literature

[Patent Literature 1] WO2018/066351

SUMMARY OF INVENTION

Technical Problem

However, a recognition error by a recognition function is not assumed in the technique described in Patent Literature 1. For example, it does not have a function to feed back errors in recognition of an event unique to a region where a group of animals crosses a road, a sign unique to a region, or an unknown event that has never been encountered before, and it only has an effect of improving recognition performance for known scenes. Therefore, in the case where there is an error in recognition, it is insufficient to ensure safety at, for example, intersections, highways for high-speed driving, and school zones used by children, pupils, and students.

Accordingly, an object of the present invention is to provide a technique for updating a recognition model so that even if there is an error in recognition in an unknown scene or the like, the scene can be immediately recognized.

Solution to Problem

In order to achieve the object, the present invention provides a recognition model distribution system that distributes a recognition model for recognizing the external environment to a vehicle, and the system includes: a data analysis unit that acquires a recognition model suitable for the vehicle from a plurality of recognition models, determines a recognition failure point of a traffic scene in the recognition model acquired by comparing with data from an external environment recognition unit provided in the vehicle, and reflects the recognition failure point on the acquired recognition model to create by a three-dimensional computer graphics video; a parameter generation unit that generates a parameter for generating a plurality of traffic scenes similar to the three-dimensional computer graphics video generated by the data analysis unit; a three-dimensional object generation unit that generates a three-dimensional traffic object by executing a traffic flow simulation using a traffic flow model created with the parameter generated by the parameter generation unit; a teacher data generation unit that creates teacher data necessary for learning of the recognition model on the basis of the three-dimensional traffic object generated by the three-dimensional object generation unit; a learning unit that executes learning of the recognition model on the basis of the teacher data generated by the teacher data generation unit; and a recognition model distribution unit that distributes a recognition model suitable for the vehicle among the plurality of recognition models.

Advantageous Effects of Invention

According to the present invention, it is possible to provide a technique for updating a recognition model so that even if there is an error in recognition in an unknown scene or the like, the scene can be immediately recognized.

Problems, configurations, and effects other than those described above will be clarified by the description of the following embodiments.

DESCRIPTION OF EMBODIMENTS

Hereinafter, embodiments of the present invention will be described using the drawings.

First Embodiment

Figure 1:
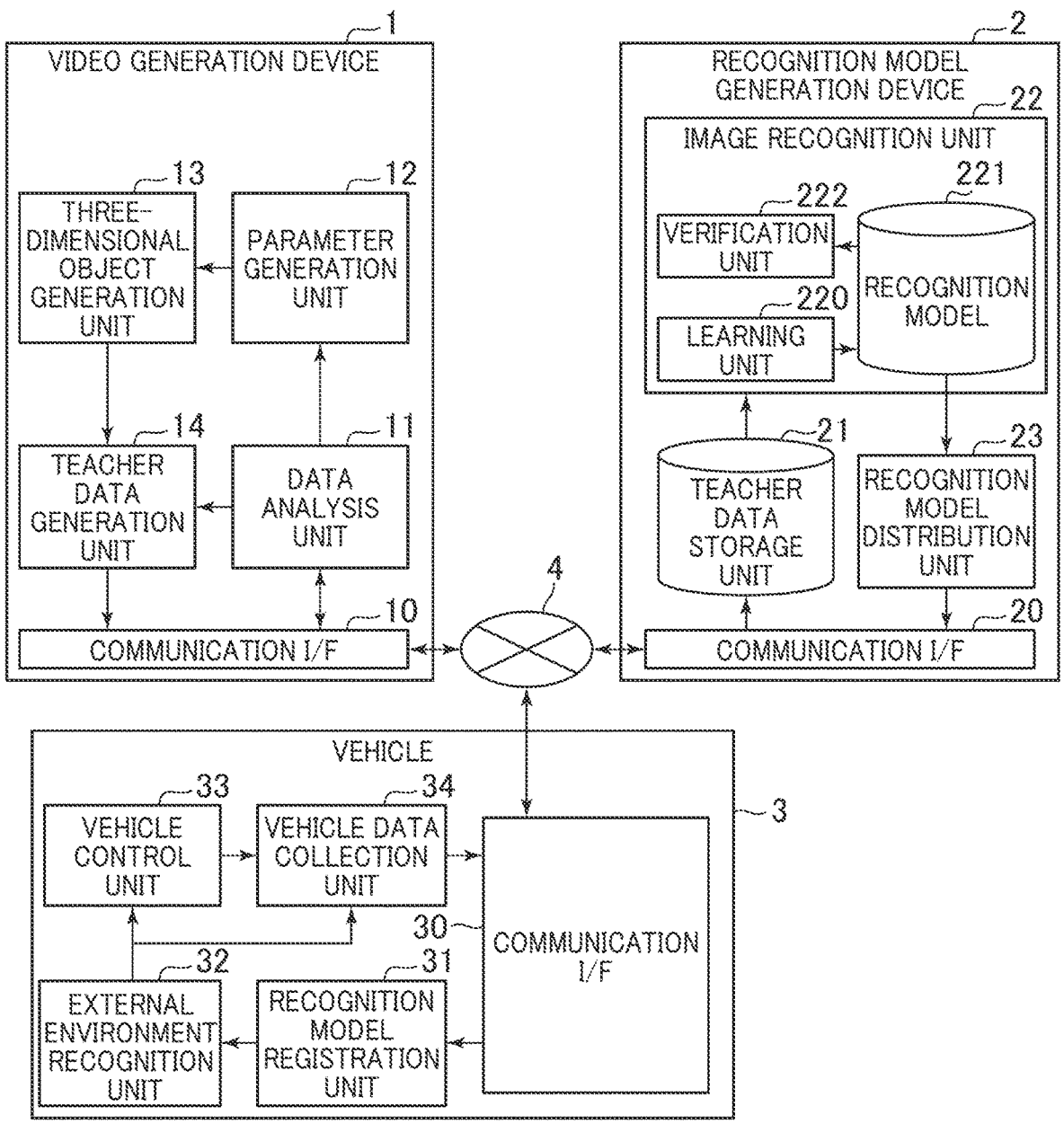
FIG. 1 is a block diagram for showing a configuration according to a first embodiment of the present invention.

FIG. 1 is a block diagram for showing a configuration according to a first embodiment of the present invention. As an example, FIG. 1 shows an example of applying to learning of a recognition model of automatic driving in a vehicle equipped with an in-vehicle camera. A recognition model distribution system of the embodiment is configured using a video generation device 1 and a recognition model generation device 2. Then, the recognition model generated in the recognition model distribution system is distributed to the vehicle.

The video generation device 1, the recognition model generation device 2, and the vehicle 3 are connected by a communication network 4, and transmit and receive necessary information via communications when necessary.

The video generation device 1 performs a traffic flow simulation on the basis of a preset parameter or a parameter generated by a parameter generation unit 12, configures the periphery of a specific vehicle with a three-dimensional object in the traffic flow simulation of every moment, and reproduces a video when a camera simulating an in-vehicle camera is installed in the three-dimensional object of the vehicle. In addition, the video generation device 1 includes a communication interface 10, a data analysis unit 11, the parameter generation unit 12, a three-dimensional object generation unit 13, and a teacher data generation unit 14.

The data analysis unit 11 receives vehicle data transmitted from the vehicle 3. Here, the data acquired from the vehicle 3 is sensor data of a sensor of an external environment recognition unit 32 provided in the vehicle, that is, a sensor such as a camera, a LIDAR (abbreviation of Light Detection and Ranging or Laser Imaging Detection and Ranging), or a sonar, data relating to operations involved in vehicle travel control, that is, the operation amounts of steering, an accelerator, and a brake, and data relating to the position and direction of the vehicle.

In addition, the data analysis unit 11 acquires the same model as the recognition model of the vehicle 3 from a plurality of recognition models stored in the recognition model generation device 2, reproduces a three-dimensional computer graphics video that becomes the same as the recognized result, compares the video with an in-vehicle camera video obtained from the vehicle 3 to extract a difference, recognizes an object existing in the difference, determines a country or a region where the video is affected, and adds the object to the reproduced three-dimensional computer graphics video to reconfigure the video. The reconfiguration in the embodiment is intended to create a three-dimensional computer graphics video reflecting the object extracted as a difference. The country or region means driving environments. The difference extracted by the data analysis unit 11 becomes a recognition failure point (error).

Figure 2:
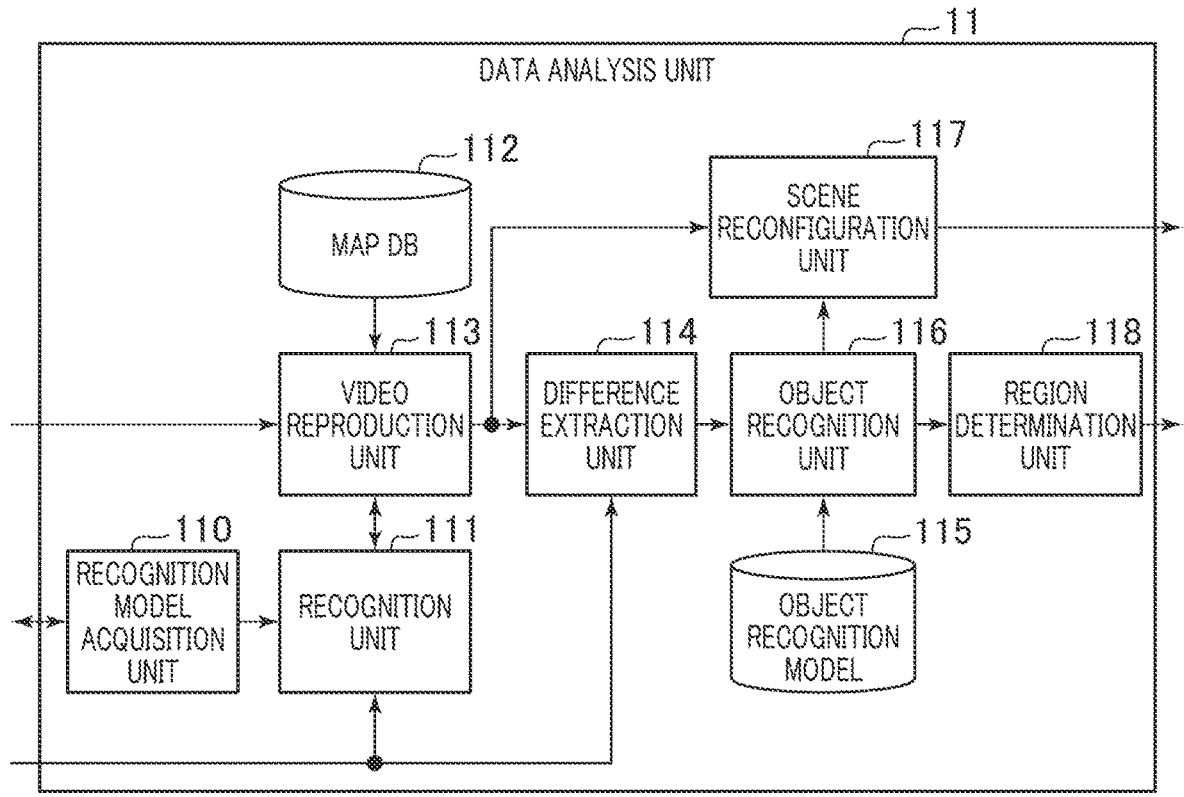
FIG. 2 is a block diagram for showing a detailed configuration of a data analysis unit 11 according to the first embodiment of the present invention.

Next, the configuration of the data analysis unit 11 will be described. FIG. 2 is a block diagram for showing a detailed configuration of the data analysis unit 11 according to the first embodiment of the present invention.

The data analysis unit 11 includes a recognition model acquisition unit 110, a recognition unit 111, a map database 112, a video reproduction unit 113, a difference extraction unit 114, an object recognition model 115, an object recognition unit 116, a scene reconfiguration unit 117, and a region determination unit 18.

The recognition model acquisition unit 110 acquires the same recognition model as the recognition model used in the vehicle 3 from a plurality of recognition models stored in the recognition model generation device 2.

The recognition unit 111 returns a recognition result for an input image. The image to be input is an image of each frame in a real video obtained from the in-vehicle camera of the vehicle 3 or an image of each frame in the three-dimensional computer graphics video generated by the video reproduction unit 113.

The map database 112 records map information, and provides map information on the periphery on the basis of position information obtained from the vehicle 3.

The video reproduction unit 113 generates a three-dimensional static traffic object from the map information of one periphery of the vehicle 3 provided from the map database 112, and arranges therein a three-dimensional vehicle object in accordance with the direction of the vehicle 3. Further, the video reproduction unit 113 arranges three-dimensional traffic objects such as other vehicles and pedestrians so as to obtain the same recognition result as the result obtained by recognizing the video of the in-vehicle camera obtained from the vehicle 3 using the recognition unit 111, and reproduces the video by a camera in a three-dimensional simulation space simulating the in-vehicle camera of the vehicle. The image is input to the recognition unit 111, and the arrangement of the three-dimensional traffic objects and the weather and sunshine in the three-dimensional simulation space are adjusted until the recognition result becomes close to the recognition result of the vehicle 3.

Figure 3:
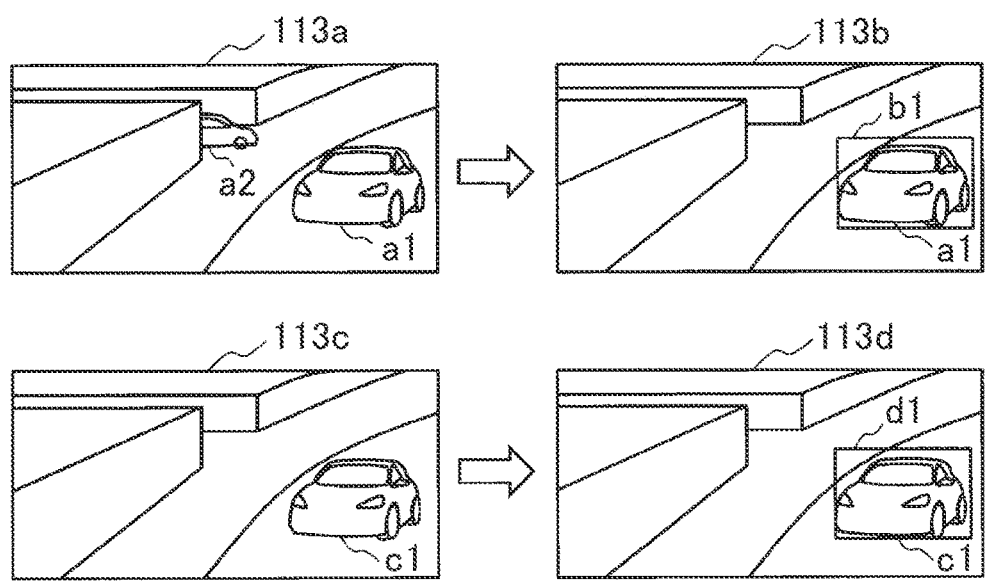
FIG. 3 is a diagram for showing a reproduction example in a three-dimensional computer graphics video in a video reproduction unit 113 according to the first embodiment of the present invention.

A reproduction example of the video reproduction unit 113 will be described using FIG. 3. FIG. 3 is a diagram for showing a reproduction example in a three-dimensional computer graphics video in the video reproduction unit 113 according to the first embodiment of the present invention.

In FIG. 3, the reference numeral 113a denotes one frame of a video obtained from the in-vehicle camera (external environment recognition unit 32) of the vehicle 3. In the image, a vehicle a1 and a vehicle a2 are reflected, and a part of the vehicle a2 is hidden by a fence. The reference numeral 113b denotes a result obtained by recognizing the image 113a by the recognition unit 111. A frame b1 in 113b indicates recognition of the vehicle a1. On the other hand, no frame is shown at the vehicle a2, which means that the vehicle a2 is not recognized. That is, the vehicle a2 is a recognition failure point. At this time, the video reproduction unit 113 arranges a three-dimensional traffic object so that the recognition result by the recognition section 111 is similar to 113b. That is, a three-dimensional computer graphics image 113c in which a vehicle c1 exists is reproduced so as to obtain a recognition result as shown in 113d.

Referring back to FIG. 2, the data analysis unit 11 will be described. In the difference extraction unit 114, the three-dimensional computer graphic image reproduced by the video reproduction unit 113 on the basis of the recognition result by the recognition unit 111 is compared with the video obtained from the in-vehicle camera (external environment recognition unit 32) of the vehicle 3, and a part as a difference is extracted. That is, the difference extraction unit 114 determines the recognition failure point.

The object recognition unit 116 performs object recognition by using an object recognition model registered in the object recognition model 115 for an image of each frame difference between the video by the vehicle 3 extracted by the difference extraction unit 114 and the video reproduced by computer graphics.

The scene reconfiguration unit 117 reconfigures a three-dimensional simulation space by arranging a three-dimensional object corresponding to the object recognized by the object recognition unit 116 at a position corresponding to the in-vehicle camera video for a similar traffic scene to the in-vehicle camera video of the vehicle 3 reproduced by the video reproduction unit 113.

Figure 4:
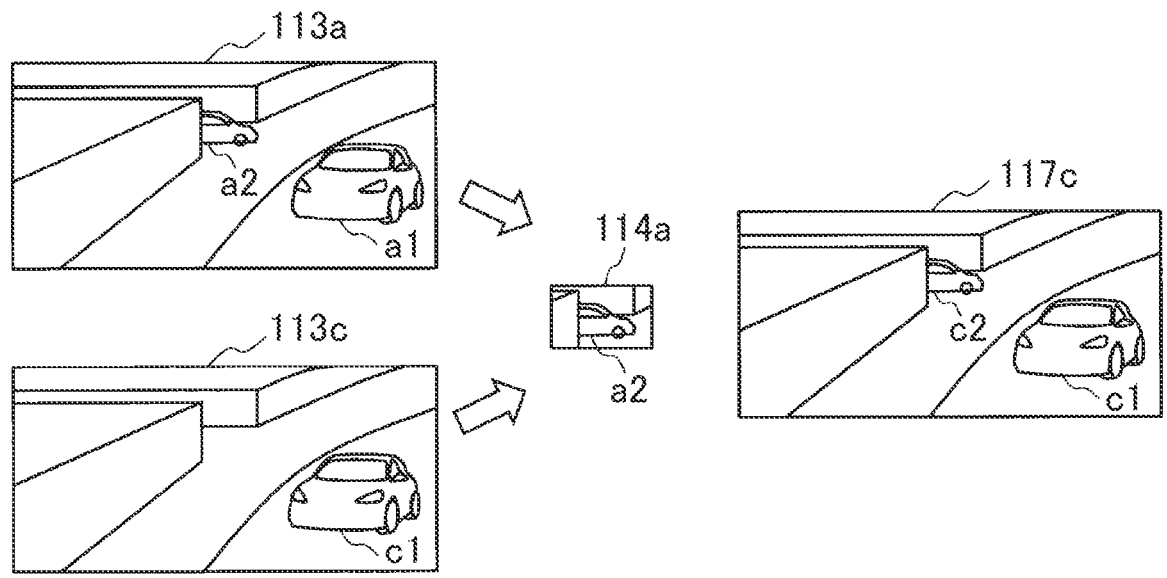
FIG. 4 is a diagram for showing an operation example in a difference extraction unit 114 and a scene reconfiguration unit 117 according to the first embodiment of the present invention.

An operation example of the difference extraction unit 114 and the scene reconfiguration unit 117 will be described using FIG. 4. FIG. 4 is a diagram for showing an operation example in the difference extraction unit 114 and the scene reconfiguration unit 117 according to the first embodiment of the present invention.

A difference image 114a is extracted by comparing the video 113a that is one frame of the video obtained from the in-vehicle camera of the vehicle 3 with a computer graphics image 113c reproduced by the video reproduction unit 113. From the difference image 114a, it is recognized to be a vehicle by the object recognition model, and a vehicle c2 corresponding to the vehicle a2 is arranged and reconfigured in the arrangement of the three-dimensional traffic object in the reproduced computer graphics image 113c. As a result, the scene reconfiguration unit 117 generates a reconfigured computer graphics image in which the vehicle c2 as shown in an image 117c is arranged.

It should be noted that although the three-dimensional traffic object is adjusted in the three-dimensional simulation space so that the in-vehicle camera video matches the recognition result of the reproduced video in FIG. 4, when the recognition model is implemented as a multi-layer CNN (Convolutional Neural Network), the result of the feature map in the middle layer may be further compared. The point of causing the recognition error can be specified in more detail in the in-vehicle camera video in some cases by the comparison.

On the basis of the object recognition result by the object recognition unit 116, a region determination unit 118 determines a country or a region where an object that cannot be recognized in the recognition model registered in a recognition model registration unit 31 of the vehicle 3 is affected. The country or region means driving environments. For example, in the case where a road sign cannot be recognized, a country or a region where the road sign is used is determined, and the result is output to the teacher data generation unit 14.

Next, referring back to FIG. 1, the continuation of the video generation device 1 will be described. The parameter generation unit 12 generates parameters for teacher data generation to generate a plurality (many) of traffic scenes similar to the three-dimensional computer graphics video reconfigured by the data analysis unit 11. The parameters generated here are, for example, parameters for adjusting the occurrence probability of an event such as jumping out of a pedestrian onto a road in addition to parameters of an area where the traffic flow simulation is executed, parameters for adjusting the speed distribution and the occurrence probability of a vehicle, and parameters for adjusting the speed distribution and the occurrence probability of a pedestrian. Specifically, when jumping out of a pedestrian in front of the preceding vehicle cannot be detected and the vehicle suddenly stops together with the preceding vehicle, the parameter generation unit 12 of the embodiment can increase the occurrence probability of a vehicle and the occurrence probability of an event due to the jumping out of a person to facilitate the generation of a similar scene.

Figure 5:
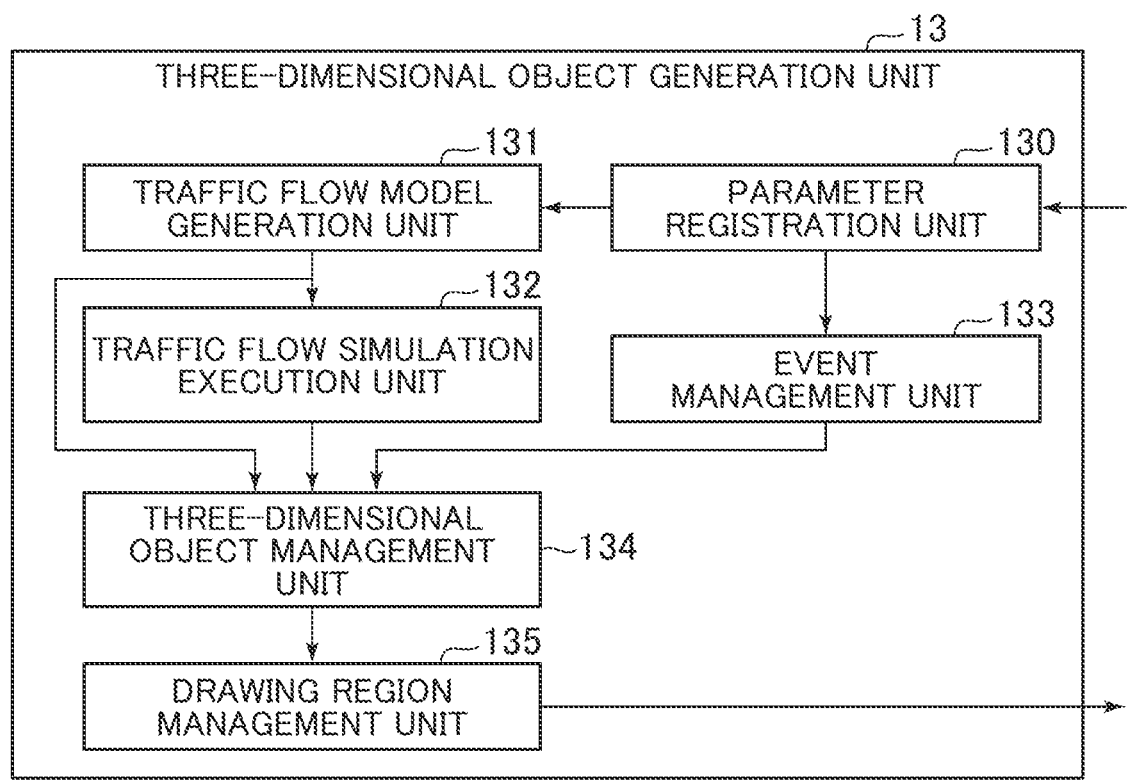
FIG. 5 is a block diagram for showing a detailed configuration of a three-dimensional object generation unit 13 according to the first embodiment of the present invention.

Next, the configuration of the three-dimensional object generation unit 13 will be described. FIG. 5 is a block diagram for showing a detailed configuration of the three-dimensional object generation unit 13 according to the first embodiment of the present invention.

The three-dimensional object generation unit 13 includes a parameter registration unit 130, a traffic flow model generation unit 131, a traffic flow simulation execution unit 132, an event management unit 133, a three-dimensional object management unit 134, and a drawing region management unit 135.

The parameter registration unit 130 registers a preset parameter or a parameter generated by the parameter generation unit 12 as a parameter necessary for video generation.

The traffic flow model generation unit 131 generates a traffic flow model necessary for a traffic flow simulation on the basis of the parameter generated by the parameter generation unit 12 and registered in the parameter registration unit 130. Here, the traffic flow model means a road network model (network information for the entire road including the length, width, and type of a road, the direction of the number of lanes, a connection relationship, and whether or not each type of vehicle can drive), a vehicle model (information such as an average speed for each type of vehicle, a route for each vehicle, and time of occurrence), a pedestrian model (information such as an average speed for each type of pedestrian, a route for each pedestrian, and time of occurrence), a traffic light model (information such as a link between a traffic light and an intersection, lighting time, and a lighting pattern), and other object models (information such as region of a building or a park and the position of a tree).

The traffic flow simulation execution unit 132 executes a micro simulation of the traffic flow on the basis of the traffic flow model generated by the traffic flow model generation unit 131. That is, all the dynamic traffic objects in the simulation space are generated, updated, and erased in each simulation step of the traffic flow simulation. For example, when a vehicle A moving from a point 1 to a point 2 occurs at time T1, the vehicle A is generated as a traffic object at the point 1 at time T1, and the position of the object of the vehicle A is updated while being affected by other vehicles, pedestrians, and traffic lights until the vehicle A arrives at the point 2, and the object of the vehicle A is erased when the vehicle A arrives at the point 2.

The event management unit 133 manages the occurrence of an event during the traffic flow simulation in the traffic flow simulation execution unit 132 on the basis of the parameter generated by the parameter generation unit 12 and registered in the parameter registration unit 130. The events managed here include, for example, changing the weather, changing the way the sunshine enters according to the time of day, and pedestrians crossing a road without a crosswalk at time T1.

The three-dimensional object management unit 134 manages all the traffic objects in the traffic flow simulation space executed by the traffic flow simulation execution unit 132 and all the traffic objects managed by the event management unit 133 as three-dimensional objects. For example, a three-dimensional road object generated from a road model generated by the traffic flow model generation unit 131 and a three-dimensional traffic light object generated from a traffic light model are managed, a vehicle object executed by the traffic flow simulation execution unit 132 is managed as a three-dimensional vehicle object, and a pedestrian object is managed as a three-dimensional pedestrian object. In the three-dimensional objects of the embodiment, the three-dimensional road object, the three-dimensional traffic light object, the three-dimensional vehicle object, and the three-dimensional pedestrian object are referred to as three-dimensional traffic objects.

Figure 6:
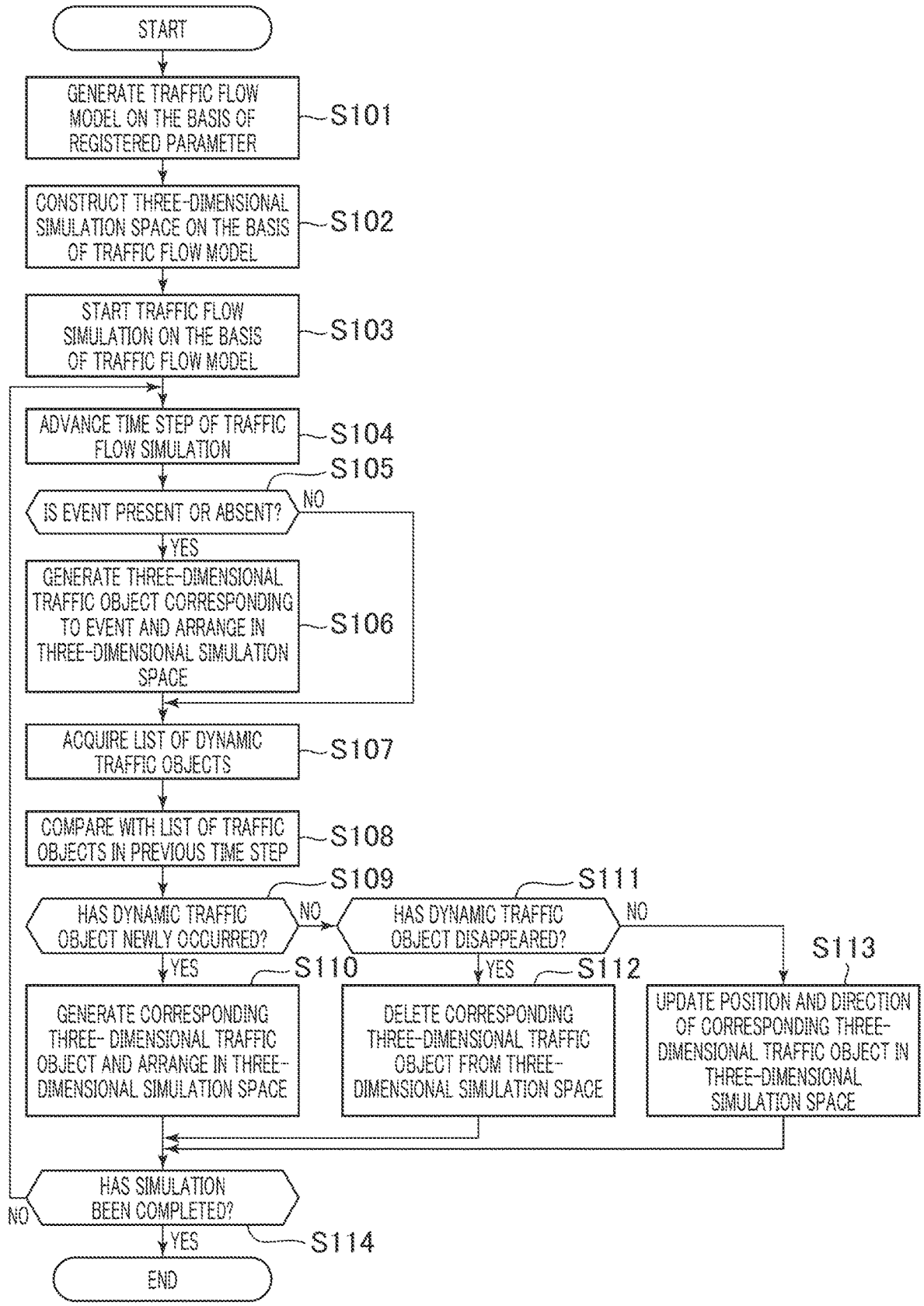
FIG. 6 is a flowchart for showing a process of a traffic flow simulation in the three-dimensional object generation unit 13 according to the first embodiment of the present invention.

Next, a process of the traffic flow simulation in the three-dimensional object generation unit 13 will be described using FIG. 6. FIG. 6 is a flowchart for showing a process of the traffic flow simulation in the three-dimensional object generation unit 13 according to the first embodiment of the present invention.

First, the three-dimensional object generation unit 13 generates traffic flow models on the basis of the registered parameters in Step S101.

In Step S102, a three-dimensional simulation space is constructed on the basis of a model relating to a static traffic object such as a road network model or other object models among the traffic flow models generated in Step S101.

In Step S103, a traffic flow simulation is started on the basis of the traffic flow model.

In Step S104, the time step of the traffic flow simulation is advanced.

In Step S105, it is determined whether or not an event based on the registered parameter occurs in the time step. In the case where the event occurs, the process proceeds to Step S106. In the case where the event does not occur, the process proceeds to Step S107.

In Step S106, a three-dimensional traffic object corresponding to the event is generated and arranged in the three-dimensional simulation space.

In Step S107, a list of dynamic traffic objects in the traffic flow simulation is acquired.

In Step S108, the list of traffic objects acquired in the previous time step is compared with the list of traffic objects acquired in the current time step.

In Step S109, as a result of the comparison, it is determined whether or not a dynamic traffic object has newly occurred. In the case where the dynamic traffic object has occurred, the process proceeds to Step S110. In the case where the dynamic traffic object has not occurred, the process proceeds to Step S111.

In Step S110, a three-dimensional traffic object corresponding to the dynamic traffic object that has newly occurred is generated and arranged in the three-dimensional simulation space.

In Step S111, it is determined as a result of the comparison whether or not the dynamic traffic object has disappeared. In the case where the dynamic traffic object has disappeared, the process proceeds to Step S112. In the case where the dynamic traffic object has not disappeared, the process proceeds to Step S113.

In Step S112, the three-dimensional traffic object corresponding to the dynamic traffic object that has disappeared is deleted from the three-dimensional simulation space.

In Step S113, for the traffic object continuing to exist from the previous time step, the position and direction of the corresponding three-dimensional traffic object are updated in the three-dimensional simulation space.

In Step S114, it is determined whether or not the traffic flow simulation has been completed. In the case where the traffic flow simulation has not been completed, the process returns to Step S104 to advance the time step and the above process is repeated. Here, in order to determine whether or not the traffic flow simulation has been completed, it is determined whether or not to have reached a predetermined number of simulation steps, or whether or not all the dynamic traffic objects have reached the destination.

By following the above flowchart, it is possible to reproduce from the two-dimensional simulation space executed in the traffic flow simulation in the three-dimensional simulation space by the three-dimensional object in the embodiment.

Figure 7:
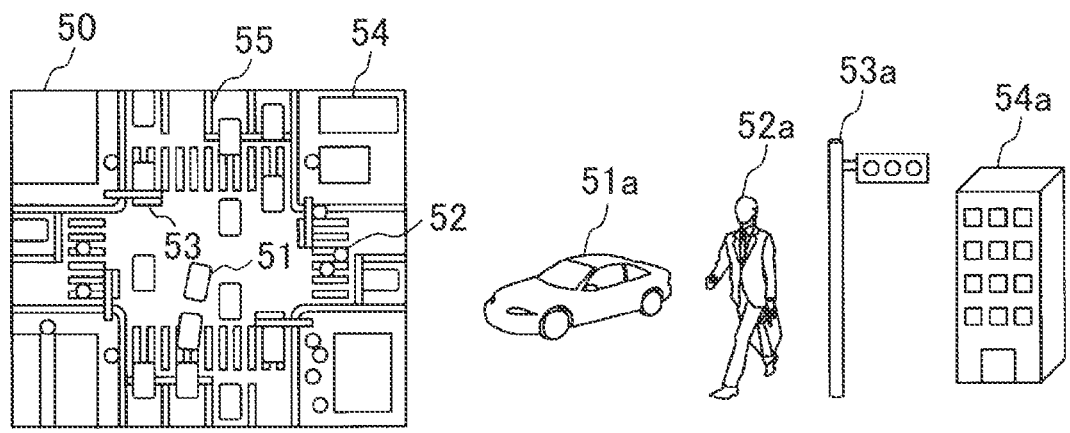
FIG. 7 is a diagram for showing an example of traffic objects managed by a traffic flow simulation execution unit 132 and three-dimensional traffic objects managed by a three-dimensional object management unit 134 according to the first embodiment of the present invention.

Next, the three-dimensional traffic object will be described using FIG. 7. FIG. 7 is a diagram for showing an example of traffic objects managed by the traffic flow simulation execution unit 132 and three-dimensional traffic objects managed by the three-dimensional object management unit 134 according to the first embodiment of the present invention.

In FIG. 7, the reference numeral 50 denotes a portion of a two-dimensional simulation space managed by the traffic flow simulation execution unit 132, 51 denotes a vehicle object, 52 denotes a pedestrian object, 53 denotes a traffic light object, and 54 denotes a building object. In addition, the reference numeral 55 denotes a white line indicating a center line, a crosswalk, a road shoulder, and the like drawn on the road.

The three-dimensional object management unit 134 executes management such as generation, update, and deletion of the three-dimensional traffic objects from the two-dimensional traffic objects. Specifically, the three-dimensional object management unit 134 manages a three-dimensional traffic object corresponding to each two-dimensional traffic object in such a manner that the vehicle object 51 is a three-dimensional vehicle object 51*a*, the pedestrian object 52 is a three-dimensional pedestrian object 52*a*, the traffic light object 53 is a three-dimensional traffic light object 53*a*, and the building object 54 is a three-dimensional building object 54*a*.

For the three-dimensional vehicle object 51*a*, the three-dimensional object may be switched according to the vehicle type described in the vehicle model, or the vehicle type, color, and the like may be randomly changed for each vehicle.

The three-dimensional pedestrian object 52*a* may be a three-dimensional pedestrian object having a different age, gender, cloth, and color according to the type of pedestrian described in the pedestrian model.

For the three-dimensional traffic light object 53*a*, the number of arrow-type traffic lights may be changed according to the connection relationship of each road at the intersection.

For the three-dimensional building object 54*a*, the height may be randomly changed, or the color and texture of the appearance may be changed.

In FIG. 5, the drawing region management unit 135 determines a point at which a camera is to be installed in the three-dimensional simulation space in which the three-dimensional traffic objects managed by the three-dimensional object management unit 134 are arranged. In the embodiment, since it is assumed that the present invention is applied to automatic driving by using an in-vehicle camera of an automobile, the vehicle is selected from the three-dimensional vehicle objects managed by the three-dimensional object management unit 134. The vehicle may be arbitrarily or randomly selected by the user. In addition, in the case where the selected vehicle object is deleted by reaching the destination or the like, another vehicle may be automatically selected. Further, a three-dimensional vehicle object satisfying a specific condition may be selected. The specific condition is, for example, a case where the relative speed with the vehicle running ahead is lower than a predetermined value, or a case where a pedestrian is going straight to an intersection while crossing a crosswalk.

In addition, the drawing region management unit 135 determines camera coordinates relative to the three-dimensional vehicle object 51a.

Figure 8:
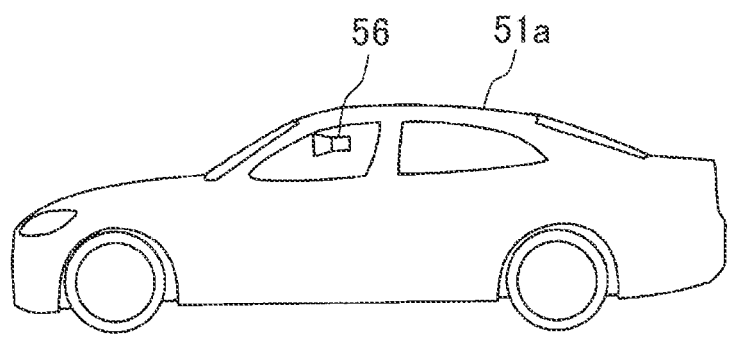
FIG. 8 is a diagram for showing an example of the position of a camera relative to a vehicle in a three-dimensional simulation space according to the first embodiment of the present invention.

FIG. 8 is a diagram for showing an example of the position of a camera relative to a vehicle in the three-dimensional simulation space according to the first embodiment of the present invention.

After selecting the vehicle object, the drawing region management unit 135 determines the coordinates of a camera 56 relative to the selected three-dimensional vehicle object 51a as shown in FIG. 8. That is, the drawing region management unit 135 simulates a camera video from at least one viewpoint in the three-dimensional simulation space. Thus, since the camera moves in accordance with the movement of the vehicle, the in-vehicle camera of the vehicle can be simulated.

Further, the drawing region management unit 135 specifies a three-dimensional traffic object entering the viewing angle of the camera installed for the selected vehicle, that is, a drawing region to be drawn as a video.

Next, referring back to FIG. 1, the configuration of the video generation device 1 will be described again. In FIG. 1, the teacher data generation unit 14 generates teacher data necessary for learning of a recognition model 221 stored in an image recognition unit 22 of the recognition model generation device 2 and correct answer data of a target to be recognized on the basis of the three-dimensional traffic object in the drawing region specified and output by the drawing region management unit 135 of the three-dimensional object generation unit 13, and outputs a target region of the generated three-dimensional computer graphics video determined by the region determination unit 118 of the data analysis unit 11.

For example, in the case of a model for performing semantic segmentation that categorizes each frame of a video on a pixel basis, a three-dimensional computer graphics video in which a three-dimensional traffic object is filled according to the type thereof and semantic information according to the filled color are generated in addition to a normal three-dimensional computer graphics video.

In addition, in the case of a model that performs object recognition for each frame of a video, information indicating a region on the image of each object and the type of object is generated in addition to a normal three-dimensional computer graphics video.

Further, in the case of a model that classifies traffic scenes or the like which the image means for each frame of a video, information indicating the classification of the scene expressed by the three-dimensional object is generated in addition to a normal three-dimensional computer graphics video.

The teacher data generation unit 14 transmits the generated three-dimensional computer graphics videos and the correct answer data of a target to be recognized to the recognition model generation device 2 via the communication interface 10 and the communication network 4.

Next, the configuration of the recognition model generation device 2 will be described. In FIG. 1, the recognition model generation device 2 includes a communication interface 20, a teacher data storage unit 21, an image recognition unit 22, and a recognition model distribution unit 23.

The communication interface 20 communicates with the video generation device 1 and the vehicle 3 via the communication network 4.

The teacher data storage unit 21 stores teacher data generated by the teacher data generation unit 14 of the video generation device 1.

The image recognition unit 22 includes a learning unit 220, a recognition model 221, and a verification unit 222, and the recognition model 221 is learned by the learning unit 220 and verified by the verification unit 222 on the basis of the teacher data stored in the teacher data storage unit 21.

Figure 9:
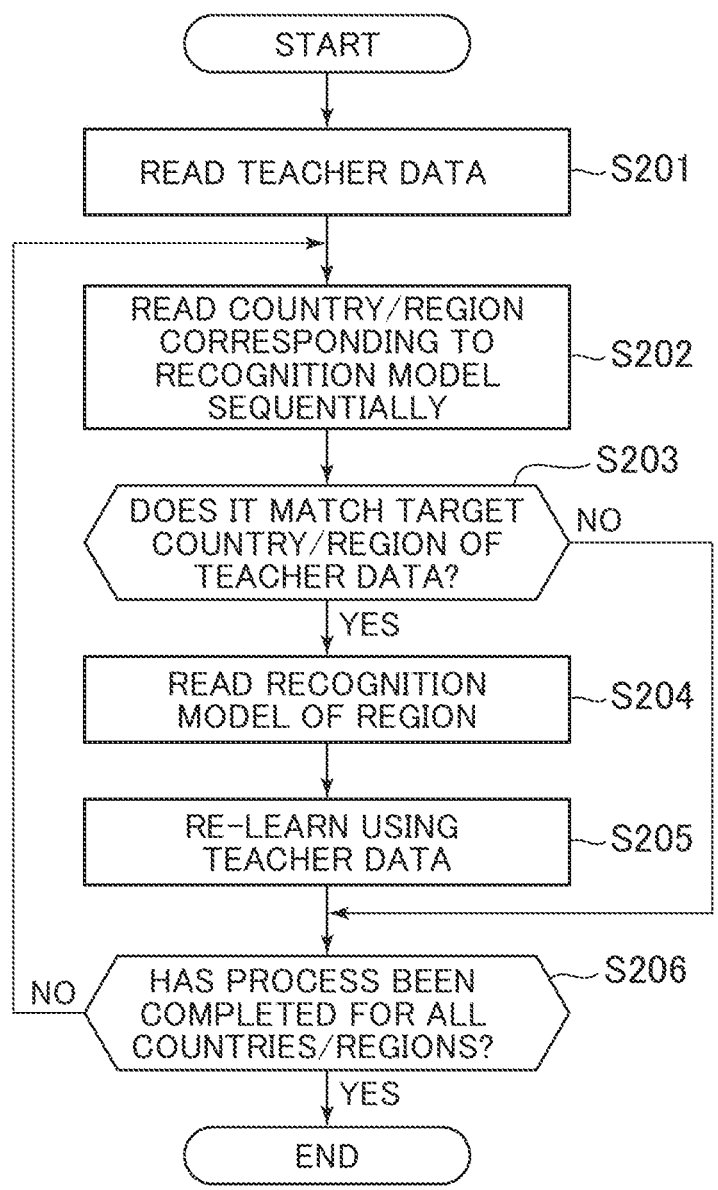
FIG. 9 is a flowchart for showing an operation flow of a learning unit 220 according to the first embodiment of the present invention.

Next, an operation of the learning unit 220 will be described using FIG. 9. FIG. 9 is a flowchart for showing an operation flow of the learning unit 220 according to the first embodiment of the present invention.

First, in Step S201, the learning unit 220 reads the teacher data stored in the teacher data storage unit 21.

In Step S202, countries or regions corresponding to the recognition model are sequentially read. For example, in the case where the recognition model is registered for each country, the registered countries are sequentially read. The country or region means driving environments.

In Step S203, it is determined whether or not the country or region read in Step S202 matches the target country or region registered as the teacher data. In the case where it matches, the process proceeds to Step S204. In the case where it does not match, the process proceeds to Step S206.

In Step S204, the recognition model of the country or region matching the target country or region of the teacher data is read.

In Step S205, the recognition model read in Step S204 is re-learned using the teacher data read in Step S201.

In Step S206, it is determined whether or not all the countries or regions included in the recognition model 221 have been checked to be the targets of the teacher data of the teacher data storage unit 21. In the case where all have been checked, the process is terminated. In the case where all have not been checked, the process returns to Step S202, and Step S202 to Step S205 are repeated for unchecked countries or regions.

As described above, in the learning unit 220, the recognition model is re-learned in accordance with the target country or region of the teacher data determined by the region determination unit 118 of the data analysis unit 11, so that the recognition model can be constructed so as to be able to respond to an event unique to a region.

The recognition model distribution unit 23 distributes the recognition model 221 suitable for the vehicle 3.

In the recognition model generation device 2, the recognition model 221 may be different depending on a country or a region. In this case, the recognition model distribution unit 23 distributes a recognition model corresponding to a country or a region. For example, a model may be different depending on a right-hand traffic country or a left-hand traffic country, or a recognition model having particularly high animal recognition accuracy may be distributed for an event unique to a region where a group of animals frequently crosses a road.

Next, the vehicle 3 will be described. The vehicle 3 includes a communication interface 30, a recognition model registration unit 31, an external environment recognition unit 32, a vehicle control unit 33, and a vehicle data collection unit 34 in addition to the functions of a general automobile (not shown). It should be noted that the vehicle has an automatic driving function in the embodiment, and the traveling of the vehicle is autonomously controlled according to the surrounding environment of the vehicle 3.

The communication interface 30 communicates with the video generation device 1 and the recognition model generation device via the communication network 4. Specifically, vehicle data collected by the vehicle data collection unit 34 is transmitted to the video generation device 1, or the recognition model distributed by the recognition model distribution unit 23 of the recognition model generation device 2 is received.

The recognition model registration unit 31 registers the recognition model received from the recognition model distribution unit 23 of the recognition model generation device 2 as a recognition model of the vehicle.

The external environment recognition unit 32 recognizes the surrounding environment of the vehicle by a device such as a LIDAR or a sonar in addition to the in-vehicle camera (not shown) mounted on the vehicle. The recognition by the in-vehicle camera is performed by the recognition model registered by the recognition model registration unit 31.

The vehicle control unit 33 controls the traveling functions of the vehicle such as acceleration/deceleration, stop, and steering of the vehicle on the basis of the recognition result of the surrounding environment of the vehicle 3 by the external environment recognition unit 32.

When a predetermined condition is satisfied, the vehicle data collection unit 34 collects information relating to the position and direction of the vehicle and information for specifying the vehicle such as a vehicle body number in addition to operation amount information of vehicle traveling control by the vehicle control unit 33 and sensor information of the external environment recognition unit by the external environment recognition unit 32, that is, video data of the in-vehicle camera, distance information of the LIDAR, reception signals of the sonar, and the like. Here, the predetermined condition is, for example, when the relative speed, relative acceleration, or relative distance to the preceding vehicle is equal to or smaller than a specific value, or when the steering angular velocity is equal to or larger than a specific value, and this is for detecting a case where the distance between the vehicle and the preceding vehicle is suddenly shortened, or a case where a pedestrian or an obstacle on the road is avoided by quick steering.

The video generation device according to the embodiment sets the traffic flow simulation so as to generate a plurality (many) of traffic scenes similar to the one that the vehicle failed to recognize and the parameter of event occurrence, so that a plurality (many) of similar traffic scenes occurs, and this scene is reproduced on a three-dimensional computer graphics video and is learned by a recognition model for performing image recognition as teacher data, resulting in improving the recognition accuracy of the scene that the vehicle failed to recognize. For this reason, even if there is an error in the recognition of an unknown event that has never been encountered before, it is fed back and a plurality (many) of scenes similar to the scene having the error is generated and learned, so that such a scene can be immediately recognized.

It should be noted that although the present invention is applied to automatic driving of a vehicle equipped with an in-vehicle camera in the embodiment, it is also applicable to an autonomous mobile robot and a construction machine that move in a specific area and have cameras. Further, the present invention can be applied to recognition by a monitoring camera for monitoring roads.

Second Embodiment

Next, a second embodiment of the present invention will be described. In the embodiment, the teacher data is efficiently generated so as to enhance the recognition accuracy of the image recognition model of the recognition model generation device.

Figure 10:
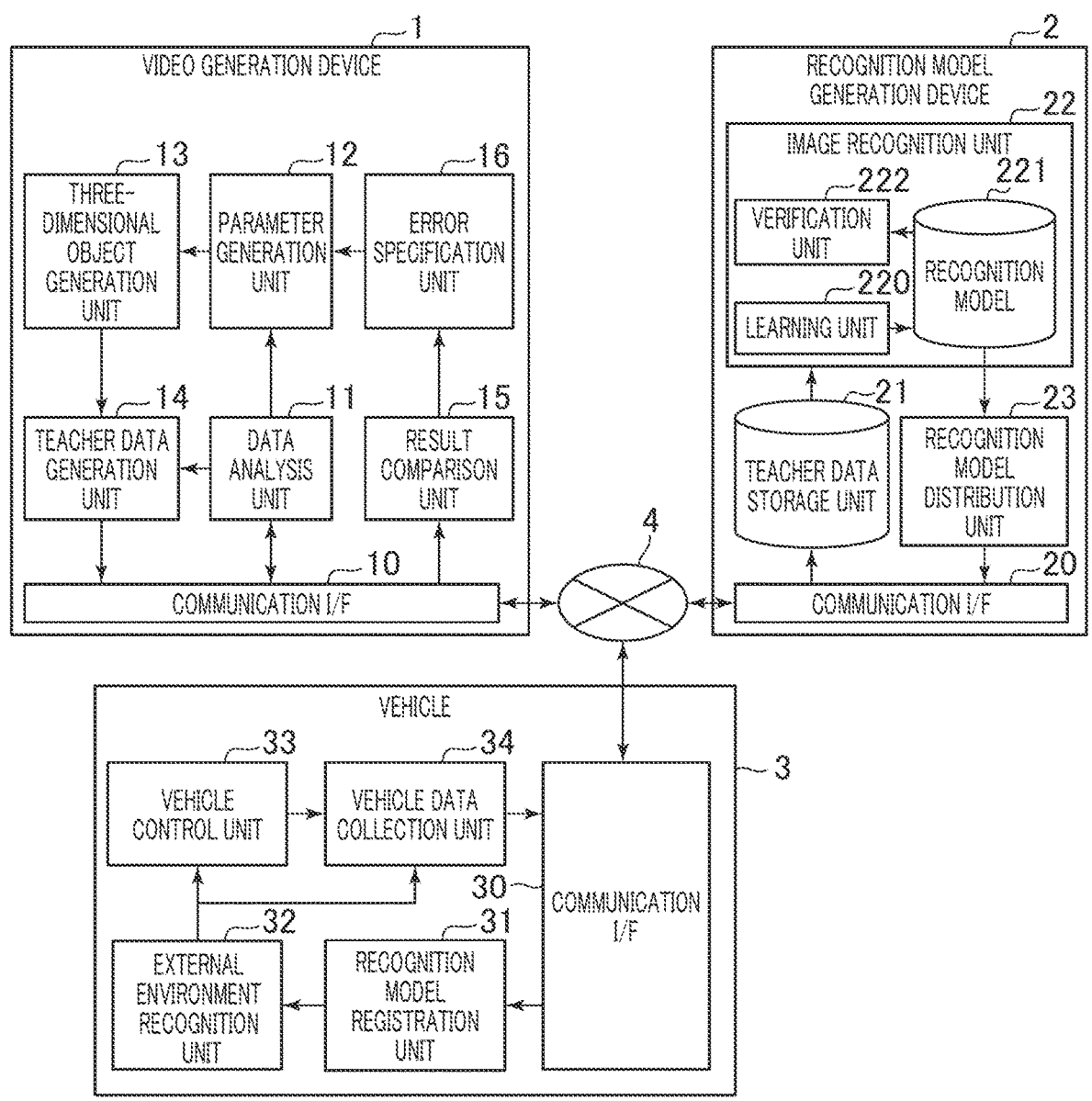
FIG. 10 is a block diagram for showing a configuration according to a second embodiment of the present invention.

FIG. 10 is a block diagram for showing a configuration according to the second embodiment of the present invention. The same names and functions as those in FIG. 1 are denoted by the same reference numerals as those in FIG. 1, and the detailed description thereof will be omitted. When internal functions are different even if the names are the same, the explanation will be given using new reference numerals.

A video generation device 1 includes a communication interface 10, a data analysis unit 11, a parameter generation unit 12, a three-dimensional object generation unit 13, a teacher data generation unit 14, a result comparison unit 15, and an error specification unit 16. The recognition model generation device 2, the vehicle 3, and the communication network 4 have the same functions as those of the first embodiment.

The result comparison unit 15 determines whether or not there is a deviation between erroneous recognition, that is, the correct answer data of a target to be recognized in the verification unit 222 of the image recognition unit 22 of the recognition model generation device 2 and the recognition result for each frame of the three-dimensional computer graphic video output from the three-dimensional object generation unit 13.

The error specification unit 16 acquires the correct answer data and the recognition result when the result comparison unit 15 determines that there is a deviation, and specifies the type and position of an unrecognized traffic object (three-dimensional object) on a three-dimensional simulation space from the comparison between the correct answer data and the recognition result.

The parameter generation unit 12 adjusts parameters so that a plurality (many) of traffic scenes similar to the recognition error specified by the error specification unit 16 is generated.

With the above configuration, according to the second embodiment, since a plurality (many) of traffic scene videos similar to the traffic scene of the image that failed to be recognized at the time of verification of the learning model is generated as the teacher data, the recognition accuracy of the recognition model can be enhanced before the distribution of the recognition model to the vehicle 3 that learns these videos.

In the first embodiment and the second embodiment, the video generation device 1 and the recognition model generation device 2 communicate with each other via the respective communication interfaces, but these may be executed as two programs in the same device or these functions may be integrated into one program.

It should be noted that the present invention is not limited to the above-described embodiments, but includes various modified examples.

For example, the embodiments described above have been described in detail for the purpose of clearly explaining the present invention, and are not necessarily limited to those having all the described configurations. In addition, some configurations of an embodiment can be replaced by a configuration of another embodiment, and a configuration of an embodiment can be added to a configuration of another embodiment. In addition, some configurations of each embodiment can be added to, deleted from, and replaced by other configurations. Further, the above-described configurations, functions, processing units, processing means, and the like may be realized by hardware by designing a part or all thereof using, for example, integrated circuits. In addition, each of the configurations, functions, and the like described above may be realized by software in such a manner that a processor interprets and executes a program realizing each function. Information of programs, tables, files, and the like for realizing each function can be stored in a memory, a recording device such as a hard disk or an SSD (Solid State Drive), or a recording medium such as an IC card, an SD card, or a DVD.

LIST OF REFERENCE SIGNS 1 video generation device
2 recognition model generation device
13 three-dimensional object generation unit
14 teacher data generation unit
11 data analysis unit
12 parameter generation unit
22 image recognition unit
113 video reproduction unit
114 difference extraction unit
117 scene reconfiguration unit
131 traffic flow model generation unit
132 traffic flow simulation execution unit
133 event management unit
134 three-dimensional object management unit
135 drawing region management unit

The invention claimed is:

1. A recognition model distribution system that distributes a recognition model for recognizing an external environment to a vehicle, the system comprising:
a data analysis unit that acquires the recognition model suitable for the vehicle from a plurality of recognition models, determines a recognition failure point of a traffic scene in the acquired recognition model by comparing with data from an external environment recognition unit provided in the vehicle, and reflects the recognition failure point on the acquired recognition model to create a three-dimensional computer graphics video;
a parameter generation unit that generates a parameter for generating a plurality of traffic scenes similar to the three-dimensional computer graphics video generated by the data analysis unit;
a three-dimensional object generation unit that generates a three-dimensional traffic object by executing a traffic flow simulation using a traffic flow model created with the parameter generated by the parameter generation unit;
a teacher data generation unit that creates teacher data necessary for learning of the acquired recognition model on the three-dimensional traffic object generated by the three-dimensional object generation unit;
a learning unit that executes learning of the acquired recognition model based on the teacher data generated by the teacher data generation unit; and
a recognition model distribution unit that distributes the recognition model suitable for the vehicle among the plurality of recognition models.

2. The recognition model distribution system according to claim 1,
wherein the data analysis unit includes: a difference extraction unit that reproduces a model close to a recognition model recognized by the external environment recognition unit on a three-dimensional computer graphics video to extract a difference by comparing a reproduced three-dimensional computer graphics video with data of the external environment recognition unit; an object recognition unit that recognizes an object relating to the difference extracted by the difference extraction unit; and a scene reconfiguration unit that creates the object recognized by the object recognition unit on the three-dimensional computer graphics video.

3. The recognition model distribution system according to claim 2,
wherein the external environment recognition unit includes at least a camera.

4. The recognition model distribution system according to claim 3, wherein the parameter generation unit generates a parameter of the traffic flow simulation and a parameter of an event so as to generate a plurality of traffic scenes similar to the three-dimensional computer graphics video created by the data analysis unit.

5. The recognition model distribution system according to claim 4,
wherein the three-dimensional object generation unit reproduces a three-dimensional simulation space by a three-dimensional object from a two-dimensional traffic flow simulation space executed by the traffic flow simulation, and generates a three-dimensional object and a three-dimensional computer graphics video when simulating a camera video from at least one viewpoint in the three-dimensional simulation space.

6. The recognition model distribution system according to claim 5,
wherein the teacher data generation unit generates correct answer data of a target to be recognized.

7. The recognition model distribution system according to claim 6,
wherein a region determination unit is provided for determining a country or a region where an object recognized by the object recognition unit is affected.

8. The recognition model distribution system according to claim 5, wherein the three-dimensional object generation unit includes:
a traffic flow model generation unit that generates a model necessary for the traffic flow simulation based on the parameter of the traffic flow simulation generated by the parameter generation unit;
a traffic flow simulation execution unit that executes the traffic flow simulation based on the traffic flow model generated by the traffic flow model generation unit;
an event management unit that manages occurrence of an event during the traffic flow simulation based on the parameter of the traffic flow simulation generated by the parameter generation unit;
a three-dimensional object management unit that manages a traffic object in the two-dimensional traffic flow simulation space executed by the traffic flow simulation execution unit and a traffic object managed by the event management unit as three-dimensional objects; and
a drawing region management unit that specifies a three-dimensional object necessary when simulating a camera video from at least one viewpoint in the three-dimensional simulation space from the three-dimensional objects managed by the three-dimensional object management unit.

9. The recognition model distribution system according to claim 6, including:
a result comparison unit that determines whether or not there is a deviation between the correct answer data of the target to be recognized and a recognition result of the three-dimensional computer graphics video output from the three-dimensional object generation unit; and
an error specification unit that, when the result comparison unit determines that there is a deviation, acquires the correct answer data of the target to be recognized and the recognition result and provides the recognition result to specify a type of unrecognized three-dimensional object.

* * * * *